(12) United States Patent
Ingle

(10) Patent No.: US 6,269,830 B1
(45) Date of Patent: Aug. 7, 2001

(54) EXTENDED AREA THERMAL ACTIVATION DEVICE

(75) Inventor: William D. Ingle, Park Ridge, IL (US)

(73) Assignee: Gas Research Institute, Chicago, IL (US)

( * ) Notice: Subject to any disclaimer, the term of this patent is extended or adjusted under 35 U.S.C. 154(b) by 0 days.

(21) Appl. No.: 09/162,213

(22) Filed: Sep. 28, 1998

(51) Int. Cl.[7] ................................................. F16K 31/64
(52) U.S. Cl. .................................. 137/79; 251/66; 251/68
(58) Field of Search .............................. 137/79; 251/66, 251/68

(56) References Cited

U.S. PATENT DOCUMENTS

| | | | |
|---|---|---|---|
| 2,131,094 | * 9/1938 | Clark | 137/79 |
| 2,476,022 | 7/1949 | Bennett | 60/528 |
| 2,560,651 | 7/1951 | Kutzler . | |
| 3,075,348 | 1/1963 | Baker | 60/528 |
| 3,105,890 | 10/1963 | Mais | 200/122 |
| 3,968,392 | 7/1976 | Buchta et al. | 313/198 |
| 3,974,844 | 8/1976 | Pimentel | 251/11 |
| 4,227,412 | 10/1980 | Stratynski et al. | 73/368.3 |
| 4,439,987 | 4/1984 | Rideout, Jr. | 60/527 |
| 4,450,686 | 5/1984 | Banks | 60/527 |
| 4,549,717 | * 10/1985 | Dewaegheneire | 137/79 |
| 4,556,934 | 12/1985 | Lemme et al. | 60/527 |
| 4,700,541 | 10/1987 | Gabriel et al. | 60/528 |
| 4,848,388 | * 7/1989 | Waldbusser | 137/80 |
| 5,127,228 | 7/1992 | Swenson | 60/527 |
| 5,505,266 | * 4/1996 | Fujiki | 169/60 |
| 5,941,269 | * 8/1999 | Ingle | 137/74 |

* cited by examiner

*Primary Examiner*—A. Michael Chambers
(74) *Attorney, Agent, or Firm*—Pauley Petersen Kinne & Fejer

(57) ABSTRACT

A method for protection of a object subject to damage under thermally hazardous conditions having a triggerable safety appliance in which an elongated shaped memory alloy material having a first end and a second end is extended over an entire area to be protected of the object and the first end of the elongated shaped memory alloy material is operably linked to a trigger for activation of the triggerable safety appliance.

17 Claims, 1 Drawing Sheet

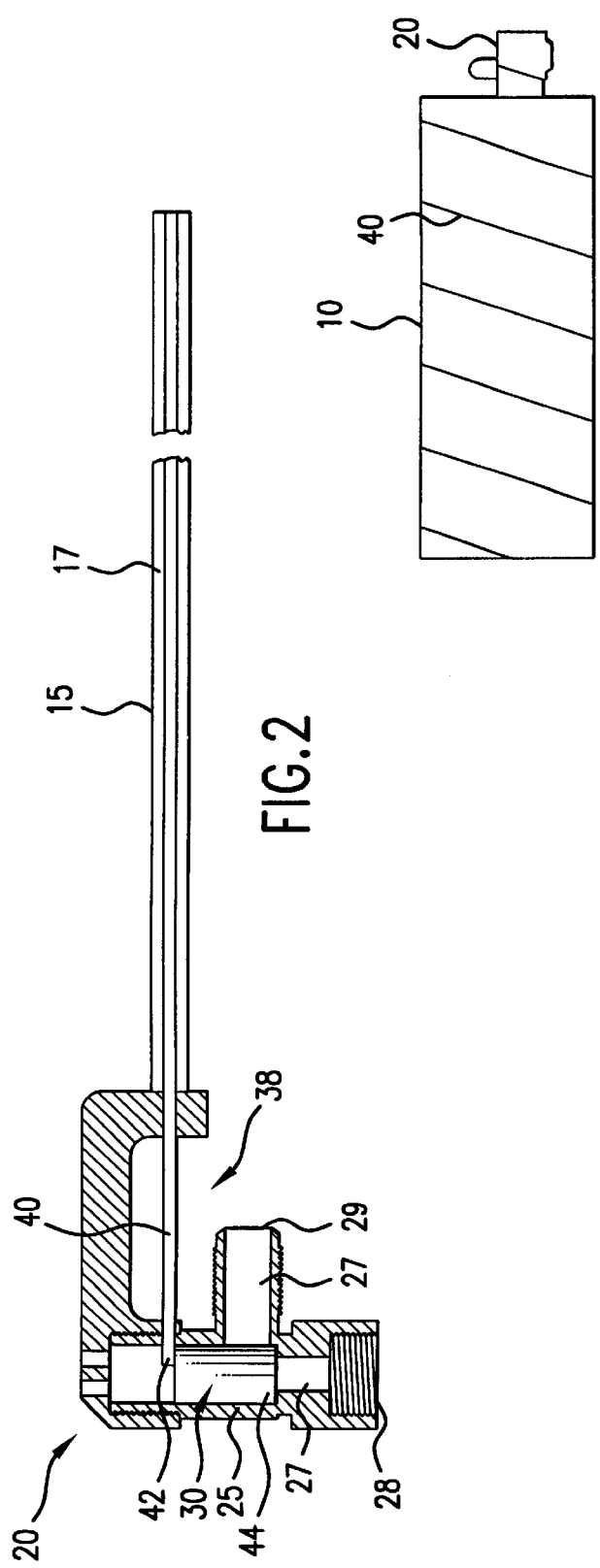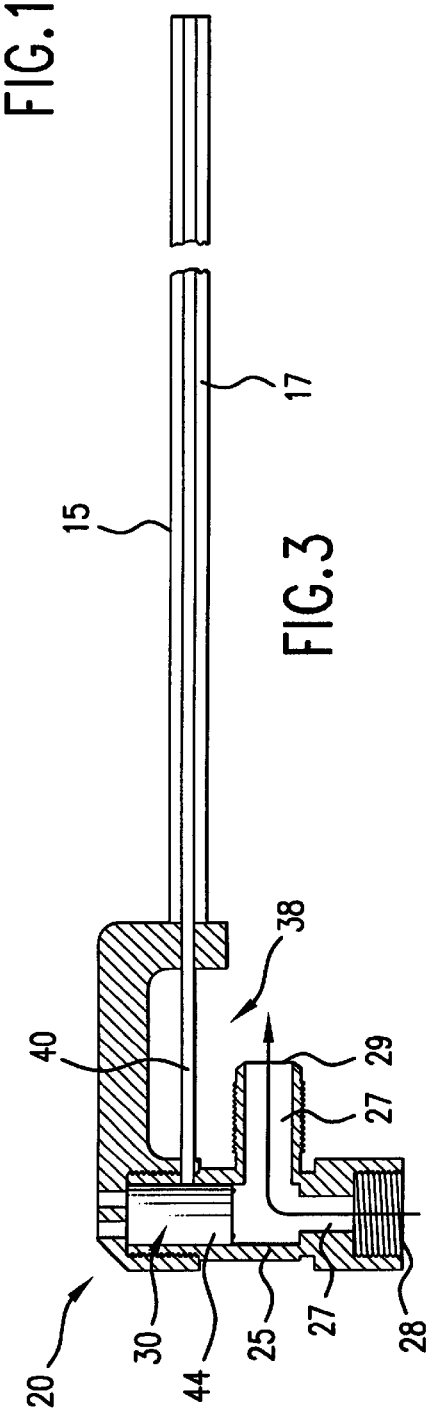

EXTENDED AREA THERMAL ACTIVATION DEVICE

BACKGROUND OF THE INVENTION

1. Field of the Invention

This invention relates to a method and apparatus for providing protection to a device, apparatus, or object subject to damage under thermally hazardous conditions. For example, the method and apparatus of this invention can be utilized to protect pressurized gas cylinders which, when exposed to high temperatures require some intervention to prevent damage to or destruction of the cylinder. The method and apparatus of this invention are particularly suitable for utilization in wide area applications, that is applications requiring protection from thermally hazardous conditions over a relatively large area, for example fire or over-heating detection in an engine compartment.

2. Description of Prior Art

Numerous devices exist for the protection of objects subject to damage under thermally hazardous conditions. In many cases, these devices act to trigger a safety appliance when the presence of a thermally hazardous condition is detected. For example, thermal pressure relief devices, such as those used with compressed natural gas systems employ fusible alloys which melt when exposed to temperatures which exceed a predetermined threshold. As the fusible alloy melts, it triggers a spring-loaded or pressure-loaded valve, allowing pressure within the system to be relieved, thereby avoiding a possible explosion. Other devices include indirect mechanically actuated pressure relief valves and, in a broader sense, sprinkler systems in buildings which are actuated under conditions of excessive heat generated by fire.

One disadvantage of these known devices is the requirement of an occurrence of a localized thermally hazardous condition in order to activate the device and trigger a desired safety response. For example, in the case of conventional pressure relief devices utilizing fusible alloys, the fusible alloy is an element of the safety device itself. Thus, while thermally hazardous conditions proximate the pressure relief device will cause the fusible alloy to melt, thereby triggering the spring-loaded or pressure-loaded valve, thermally hazardous conditions which occur at a distance from the pressure relief device may not trigger the safety mechanism while still creating a condition which is hazardous to the object being protected by the pressure relief device. For example, conventional pressure relief devices for pressurized gas cylinders are often located at one end of the pressurized cylinder and, thus, heat generated by a fire, for example near a middle portion or at an opposite end of the cylinder, must be conducted through the cylinder and to the pressure relief device before the trigger mechanism functions. Many pressurized gas cylinders are constructed of composite materials which have a relatively low thermal conductivity and, thus, can result in relatively long response times for the pressure relief devices to operate. Excessive heat transfer to the pressurized gas cylinder without releasing pressurized fluid within the cylinder can defeat the purpose of a pressure relief device and result in an explosion.

Remotely operated pressure relief valves are taught, for example, by U.S. Pat. No. 3,974,844. There, a valve device is remotely operated by transmitting electrical power through a wire that deforms from a greater length to a shorter original or memory length when a selected current is applied to the wire heating the wire to a temperature above a transition temperature. When the wire cools, it returns to the greater natural length. The wire is directly connected to a valve stem that is connected to a valve plug.

A shaped memory alloy material is a material which deforms when the material reaches or exceeds a given threshold temperature and returns to its original shape when the temperature of the material drops below the threshold temperature. U.S. patent application Ser. No. 08/687,743 teaches a thermal triggering mechanism for a pressure relief device which is triggered by deformation of a shaped memory alloy element. The shaped memory alloy element in its natural state is elongated and shortens when heated to a set temperature. The shaped memory alloy element may be mechanically linked to another suitable element, such as a rod or cable, for interaction with the closure element of a pressure relief device. However, if the thermally hazardous condition to the device arises at a distance from the shaped memory alloy element, the device being protected may be subjected to excessive thermal conditions without the shaped memory alloy element being heated resulting in the pressure relief device not being activated.

SUMMARY OF THE INVENTION

It is one object of this invention to provide an apparatus which is capable of providing wide area protection to an object subject to damage under thermally hazardous conditions.

It is another object of this invention to provide a method for protection of an object subject to damage under thermally hazardous conditions which provides protection against thermally hazardous conditions to which any portion of the object being protected may be exposed.

These and other objects of this invention are achieved by a method for protection of a device subject to damage under thermally hazardous conditions, which device is fitted with a triggerable safety appliance, comprising the steps of extending an elongated shaped memory alloy material over an entire area of the device to be protected and connecting the first end of the elongated shaped memory alloy material to a trigger means for activation of the triggerable safety appliance. In accordance with one embodiment of this invention, the elongated shaped memory alloy material is in the form of a rod. In accordance with another embodiment of this invention, the elongated shaped memory alloy material is in the form of a wire. By extending the elongated shaped memory alloy material over the entire area of the object to be protected, exposure of any portion of the object to a thermally hazardous condition will cause the shaped memory alloy material to expand or contract as necessary for operation of the triggerable safety appliance. Thus, even though the thermally hazardous condition arises at a substantial distance from the triggerable safety appliance, which distance is such that a conventional thermally activated triggerable safety appliance would either be delayed in triggering or not trigger at all, thereby resulting in damage to the object being protected, the triggerable safety appliance is immediately triggerable, thereby reducing the potential for damage to the object being protected.

In a device having a body subject to damage under thermally hazardous conditions, these and other objects of this invention are achieved by a triggerable safety appliance operatively connected to the body, which triggerable safety appliance acts to protect the body from damage upon being triggered. An elongated shaped memory alloy material having a first end and a second end extends over an area of the body exposed to a potentially thermally hazardous condition. The first end is operatively connected to a trigger of the triggerable safety appliance.

The unique feature of this invention is that it provides thermal detection and, thus, protection against thermally hazardous conditions over a wide area to be protected. Prior applications employing shaped memory alloy materials as mechanical thermal detection means utilize relatively short lengths of shaped memory alloy material in a containment mechanism or module. In many instances, these applications employ extended linkages to connect the shaped memory alloy material module to the mechanism to be activated. In contrast thereto, this invention provides for an extended length of shaped memory alloy material for deployment over a wide variety of surfaces and geometries.

BRIEF DESCRIPTION OF THE DRAWINGS

These and other objects of this invention will be better understood from the following detailed description taken in conjunction with the drawings wherein:

FIG. 1 is a schematic diagram of a device subject to damage under thermally hazardous conditions protected by an extended area thermal activation device in accordance with this invention;

FIG. 2 is a partial cross-sectional view of a pressure relief valve in a closed position suitable for use in conjunction with the thermal activation device of this invention; and FIG. 3 is a partial cross-sectional view of the pressure relief valve shown in FIG. 2 in an open position.

DESCRIPTION OF PREFERRED EMBODIMENTS

FIG. 1 is a schematic diagram showing an object, in particular, a gas cylinder 10 having a pressure relief device 20 which can be activated to relieve pressure within the cylinder when the gas pressure in the cylinder exceeds safe limits. A pressure relief device suitable for use in this type of application is shown in FIGS. 2 and 3. Pressure relief device 20 comprises valve body 25 having passageway 27 which includes a side port discharge through which vented pressurized fluid can flow and closure element 30 which moves between a closed position as shown in FIG. 2 and an open position as shown in FIG. 3. As shown, closure element 30 comprises piston 44 which preferably has a circular cross-section and is free to slide and rotate with respect to valve body 25. In the closed position, piston 44 blocks passageway 27 and, thus, prevents communication between high-pressure end 28 and low pressure end 29 of passageway 27. In the open position, piston 44 is moved from the closed position, thereby opening passageway 27 and allowing high-pressure end 28 to communicate with low pressure end 29. As shown in FIG. 2, thermal triggering element 38 comprises shaped memory alloy element 40 having end portion 42 which interferes with movement of closure element 30 with respect to valve body 25 in the closed position.

Shaped memory alloy materials are known to those persons skilled in the art as offering predictable, reliable and consistent deformations or changes in shape. Shaped memory alloy materials often comprise a series of alloys, such as nickel and titanium, and exhibit a unique property referred to as memory shape, by annealing the alloy material into any desired shape. Once deformed, shaped memory alloy element 40 can be trained to return to the memory shape by heat transfer. Shaped memory alloy element 40 can be designed to exert considerable forces and, thus, accomplish significant work as it returns to the memory shape. As shaped memory alloy element 40 cools, it returns to its natural shape. Shaped memory alloy element 40, according to this invention, has a faster response time and greater structural strength than conventional eutectic metals. The work output derived from shaped memory alloy element 40 of this invention is greater than the work output derived from conventional bi-metal elements.

As clearly shown in FIG. 2, in the closed position of closure element 30, shaped memory alloy element 40 interferes with movement of closure element 30 with respect to valve body 25. It will be apparent to those skilled in the art that shaped memory alloy element 40 can either directly interfere with movement of closure element 30 as shown in FIG. 2 or indirectly interfere with movement of closure element 30 by being connected to a separate trigger mechanism which interferes with movement of closure element 30.

FIG. 3 shows shaped memory alloy element 40 shortened with respect to the length shown in FIG. 2. According to one preferred embodiment of this invention, the reduced length is accomplished by heating shaped memory alloy element 40 to a set temperature at which shaped memory alloy element 40 returns to its natural, or memory, state. The generated forces move shaped memory alloy element 40 so that interference with closure element 30 is eliminated, as shown in FIG. 3. Eliminating the interference allows closure element 30 to move toward and/or into the open position in which pressurized fluid vents through passageway 27 as indicated by the arrow in FIG. 3.

As previously indicated, one of the shortcomings of known systems which utilize shaped memory alloy materials for triggering of safety devices is that the shaped memory alloy material is either located locally with respect to the safety device being triggered or at a distance therefrom and connected by a mechanical linkage to the safety device. As a result, if the specific location of the shaped memory alloy material is not subjected to any significant temperature change due to the occurrence of a thermally hazardous condition, the shape of the shaped memory alloy material will remain unchanged, and the triggering mechanism will not be activated. As a result, the object being protected from thermally hazardous conditions can, in fact, be exposed to thermally hazardous conditions without triggering of the safety mechanism. The method and apparatus of this invention overcome this shortcoming.

To provide complete protection for gas cylinder 10 as shown in FIG. 1, shaped memory alloy element 40 is elongated to a sufficient length to enable it to be wrapped completely around the entire surface of gas cylinder 10. As a result, exposure of any portion of gas cylinder 10 to thermally hazardous conditions will result in the deformation of elongated shaped memory alloy element 40 which, in turn, will result in closure element 30 of pressure relief device 20 moving with respect to valve body 25 from a closed position to an open position, thereby enabling pressurized gas within the cylinder to escape.

In accordance with one preferred embodiment of this invention, elongated shaped memory alloy element 40, having a first end operably linked to a trigger means for activation of a triggerable safety appliance, has a second end which is fixed so as to restrict movement thereof. Elongated shaped memory alloy element 40 in accordance with one embodiment of this invention is in the form of a rod. In accordance with another embodiment, elongated shaped memory alloy element 40 is in the form of a wire.

In accordance with one preferred embodiment of this invention, elongated shaped memory alloy element 40 is disposed within an elongated casing 15 and said second end is fixed to an end of said elongated casing. To protect both the elongated casing 15 and the elongated shaped memory alloy element 40 from wear arising from contact between them, a wear resistant material is provided in an annular space 17 between elongated casing 15 and elongated shaped memory alloy element 40.

It will be apparent to those skilled in the art that the method of this invention, as demonstrated in FIG. 1, can be applied to virtually any object requiring protection from thermally hazardous conditions. For example, a prefabricated assembly of the shaped memory alloy element 40 and elongated casing 15 could be embedded in a larger assembly such as a composite pressure cylinder. In addition, the shaped memory alloy material can be used in conjunction with any number of known safety devices including alarms.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A method for protection of a device subject to damage under thermally hazardous conditions having a triggerable safety appliance comprising the steps of:
    extending an elongated shaped memory alloy material having a first end and a second end completely around said device; and
    connecting said first end of said elongated shaped memory alloy material to a thermally activatable trigger means for activation of said triggerable safety appliance.

2. A method in accordance with claim 1, wherein said second end of said elongated shaped memory alloy is fixed, thereby restricting movement of said second end.

3. A method in accordance with claim 1, wherein said elongated shaped memory alloy material is in a form of a rod.

4. A method in accordance with claim 1, wherein said elongated shaped memory alloy material is in a form of a wire.

5. A method in accordance with claim 1, wherein said elongated shaped memory alloy material is disposed within an elongated casing.

6. A method in accordance with claim 5, wherein said second end of said elongated shaped memory alloy is fixed to an end of said elongated casing.

7. A method in accordance with claim 1, wherein said device is a pressurized gas cylinder.

8. A method in accordance with claim 7, wherein said pressurized gas cylinder is a composite pressure cylinder and said elongated shaped memory alloy material is embedded within a wall thereof.

9. A method in accordance with claim 1, wherein said triggerable safety appliance is a pressure relief valve.

10. In a device having a body subject to damage under thermally hazardous conditions, the improvement comprising:
    a triggerable safety appliance operatively connected to said body, said triggerable safety appliance acting to protect said body from damage upon being triggered; and
    an elongated shaped memory alloy material having a first end and a second end and extending completely around said body, said first end operatively connected to a trigger of said triggerable safety appliance.

11. A device in accordance with claim 10, wherein said body is a pressurized gas cylinder and said triggerable safety appliance is a pressure relief valve.

12. A device in accordance with claim 10, wherein said elongated shaped memory alloy material is in a form of a rod.

13. A device in accordance with claim 10, wherein said elongated shaped memory alloy material is in a form of a wire.

14. A device in accordance with claim 10, wherein said elongated shaped memory alloy material is disposed within an elongated casing.

15. A device in accordance with claim 14, wherein said second end of said elongated shaped memory alloy is restrained at an end of said elongated casing.

16. A device in accordance with claim 14 further comprising a wear resistant material disposed in an annular space formed between said elongated shaped memory alloy material and said elongated casing.

17. A device in accordance with claim 10, wherein said triggerable safety appliance is an alarm.

* * * * *